United States Patent
Jin

(10) Patent No.: US 12,481,761 B2
(45) Date of Patent: Nov. 25, 2025

(54) SECURE BOOT METHOD OF IoT APPARATUS, IoT APPARATUS AND STORAGE MEDIUM

(71) Applicant: BEIJING XIAOMI MOBILE SOFTWARE CO., LTD., Beijing (CN)

(72) Inventor: Ze Jin, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 171 days.

(21) Appl. No.: 18/228,323

(22) Filed: Jul. 31, 2023

(65) Prior Publication Data

US 2024/0311489 A1    Sep. 19, 2024

(30) Foreign Application Priority Data

Mar. 15, 2023   (CN) .......................... 202310270037.5

(51) Int. Cl.
*G06F 21/57* (2013.01)

(52) U.S. Cl.
CPC .......... *G06F 21/575* (2013.01); *G06F 21/572* (2013.01)

(58) Field of Classification Search
CPC .............................. G06F 21/575; G06F 21/572
See application file for complete search history.

(56) References Cited

U.S. PATENT DOCUMENTS

| | | | | |
|---|---|---|---|---|
| 2013/0185548 A1* | 7/2013 | Djabarov | ............ | G06F 11/1433 713/2 |
| 2013/0262877 A1* | 10/2013 | Neve De Mevergnies | ................. | G06F 21/602 726/19 |
| 2017/0115984 A1* | 4/2017 | Lu | ............................ | G06F 8/654 |
| 2018/0097639 A1* | 4/2018 | Gulati | ....................... | G09C 1/00 |
| 2018/0324802 A1* | 11/2018 | Watts | .................... | H04W 16/10 |
| 2019/0129866 A1* | 5/2019 | Peng | .................. | G06F 12/1408 |
| 2020/0089889 A1* | 3/2020 | Kim | .................... | G06F 21/6209 |
| 2020/0252207 A1* | 8/2020 | Hanel | ...................... | H04L 9/083 |
| 2021/0103661 A1* | 4/2021 | Wu | ....................... | G06F 21/572 |
| 2021/0334381 A1* | 10/2021 | Zhu | ......................... | G06F 21/79 |

(Continued)

OTHER PUBLICATIONS

European Patent Application No. 23189566.5, Search and Opinion dated Jan. 30, 2024, 8 pages.

(Continued)

*Primary Examiner* — Hyun Soo Kim
(74) *Attorney, Agent, or Firm* — Cozen O'Connor

(57) ABSTRACT

A secure boot method of an Internet of Things (IoT) apparatus includes: in response to a system boot signal of the IoT apparatus, verifying an authentication signature of a bootloader firmware and an authentication signature of an application layer (App) firmware; reading an encryption key stored in a one-time programmable memory in response to determining that the authentication signature of the bootloader firmware and the authentication signature of the App firmware both pass verification, in which the encryption key is configured to have a write protection attribute; decrypting the App firmware according to the encryption key, and running the decrypted App firmware; and in response to determining to read encrypted flash-memory partition data in a flash memory (Flash), decrypting the encrypted flash-memory partition data according to the encryption key, so as to securely boot up the IoT apparatus.

15 Claims, 5 Drawing Sheets

(56) References Cited

U.S. PATENT DOCUMENTS

2023/0020278 A1\* 1/2023 Maletsky ................ G06F 21/34
2023/0095143 A1\* 3/2023 Chen ..................... H04L 63/123
                                                          713/2

OTHER PUBLICATIONS

Kosemen, C. et al. "Tamper Resistance Functions on Internet of Things Devices" IEEE, 2021 Innovations in Intelligent Systems and Applications Conference, Oct. 6, 2021, 5 pages.

\* cited by examiner

SECURE BOOT METHOD OF IoT APPARATUS, IoT APPARATUS AND STORAGE MEDIUM

CROSS-REFERENCE TO RELATED APPLICATION

This application is based on and claims priority to Chinese Patent Application No. 202310270037.5 filed on Mar. 15, 2023, the entire contents of which are incorporated herein by reference for all purposes.

BACKGROUND

In the related art, apparatus certificate information and key information of an Internet of Things (IoT) apparatus are usually stored by hard coding in the code, or stored in plain text in the flash memory (Flash) of the IoT apparatus. As a result, data security is low and the data is easy to acquire. This issue may cause the certificate of the authenticated IoT apparatus to be copied to the unauthenticated IoT apparatus, so that the unauthenticated IoT apparatus is disguised as an authenticated IoT apparatus. Moreover, the leakage of the apparatus certificate information and key information leads to attack on the IoT apparatus by using the apparatus certificate and key information, which reduces security of the IoT apparatus.

SUMMARY

The present disclosure relates to a field of Internet of Things (IoT), and more particularly to a secure boot method of an IoT apparatus, an IoT apparatus and a storage medium.

According to a first aspect of embodiments of the present disclosure, there is provided a secure boot method of an IoT apparatus. The IoT apparatus supports at least one protocol, and the method includes: in response to a system boot signal of the IoT apparatus, verifying an authentication signature of a bootloader firmware and an authentication signature of an application layer (App) firmware; reading an encryption key stored in a one-time programmable memory in response to determining that the authentication signature of the bootloader firmware and the authentication signature of the App firmware both pass verification, in which the encryption key is configured to have a write protection attribute; decrypting the App firmware according to the encryption key, and running the decrypted App firmware; and in response to determine to read encrypted flash-memory partition data in a flash memory (Flash), decrypting the encrypted flash-memory partition data according to the encryption key, so as to securely boot up the IoT apparatus.

According to a second aspect of embodiments of the present disclosure, there is provided an Internet of Things (IoT) apparatus, which includes: at least one processor; and a memory communicated with the at least one processor. The memory stores instructions executable by the at least one processor, and when the instructions are executed by the at least one processor, the at least one processor is configured to verify an authentication signature of a bootloader firmware and an authentication signature of an application layer (App) firmware, in response to a system boot signal of the IoT apparatus; read an encryption key stored in a one-time programmable memory, in response to determining that the authentication signature of the bootloader firmware and the authentication signature of the App firmware both pass verification, wherein the encryption key is configured to have a write protection attribute; decrypt the App firmware according to the encryption key, and run the decrypted App firmware; and in response to determining to read encrypted flash-memory partition data in a flash memory (Flash), decrypt the encrypted flash-memory partition data according to the encryption key, so as to securely boot up the IoT apparatus.

According to a third aspect of embodiments of the present disclosure, there is provided a non-transitory computer-readable storage medium storing computer instructions. The computer instructions are configured to allow a computer to: verify an authentication signature of a bootloader firmware and an authentication signature of an application layer (App) firmware, in response to a system boot signal of the IoT apparatus; read an encryption key stored in a one-time programmable memory, in response to determining that the authentication signature of the bootloader firmware and the authentication signature of the App firmware both pass verification, wherein the encryption key is configured to have a write protection attribute; decrypt the App firmware according to the encryption key, and run the decrypted App firmware; and in response to determining to read encrypted flash-memory partition data in a flash memory (Flash), decrypt the encrypted flash-memory partition data according to the encryption key, so as to securely boot up the IoT apparatus.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of the specification, illustrate embodiments consistent with the present disclosure and together with the description, serve to explain the principles of the present disclosure.

DETAILED DESCRIPTION

Reference will now be made in detail to illustrative embodiments, examples of which are illustrated in the accompanying drawings. When the following description refers to the drawings, unless otherwise indicated, the same numbers in different drawings indicate the same or similar elements. The implementations described in the following illustrative embodiments do not represent all embodiments consistent with the present disclosure. Rather, they are merely examples of devices and methods consistent with some aspects of the present disclosure as detailed in the appended claims.

Figure 1:
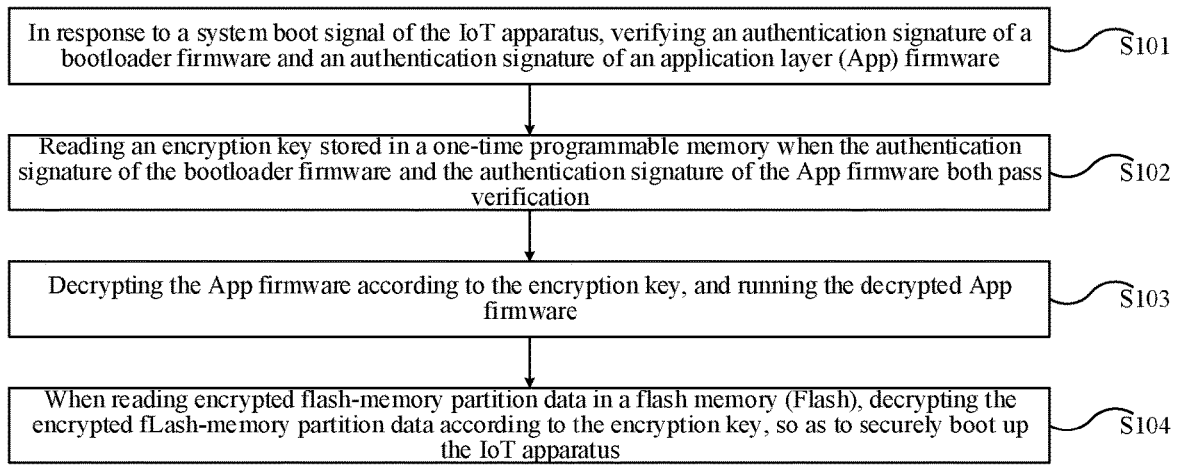
FIG. 1 is a flow chart of a secure boot method of an IoT apparatus according to an illustrative embodiment.

FIG. 1 is a flow chart of a secure boot method of an Internet of Things (IoT) apparatus according to an illustrative embodiment. As shown in FIG. 1, the method may include but not be limited to the following steps.

At step S101, in response to a system boot signal of the IoT apparatus, an authentication signature of a bootloader firmware and an authentication signature of an application layer (App) firmware are verified.

In the embodiments of the present disclosure, the IoT apparatus supports at least one protocol, and the at least one protocol may include a Matter protocol.

For example, in response to determining that the system boot signal of the IoT apparatus is received, it is verified whether the authentication signature of the bootloader firmware and the authentication signature of the App firmware used for realizing secure boot in the system are correct.

It should be noted that the bootloader firmware and the App firmware for realizing secure boot may be signed in advance with a security key, so that the authentication signatures of the bootloader firmware and the App firmware can be verified with a verification public key matched with the security key, so as to ensure that only the firmware signed with the security key can pass the verification.

In the embodiments of the present disclosure, the security key used to sign the bootloader firmware for realizing secure boot may be the same as or different from the security key used to sign the App firmware for realizing secure boot.

At step S102, an encryption key stored in a one-time programmable memory is read, when the authentication signature of the bootloader firmware and the authentication signature of the App firmware pass verification.

In the embodiments of the present disclosure, the encryption key is provided with a write protection attribute.

For example, when both the authentication signature of the bootloader firmware and the authentication signature of the App firmware pass the verification, the encryption key stored in the one-time programmable memory (efuse) of the IoT apparatus is read.

At step S103, the App firmware is decrypted according to the encryption key, and the decrypted App firmware is run.

For example, the App firmware is decrypted according to the encryption key read in the previous step, and the decrypted App firmware is run.

At step S104, when encrypted flash-memory partition data in a flash memory (Flash) is read, the encrypted flash-memory partition data is decrypted according to the encryption key, so as to securely boot up the IoT apparatus.

For example, when the data stored in the encrypted flash-memory partition in the Flash is read, the encrypted flash-memory partition data is decrypted according to the encryption key, and the IoT apparatus is securely booted up based on the decrypted data.

Figure 2:
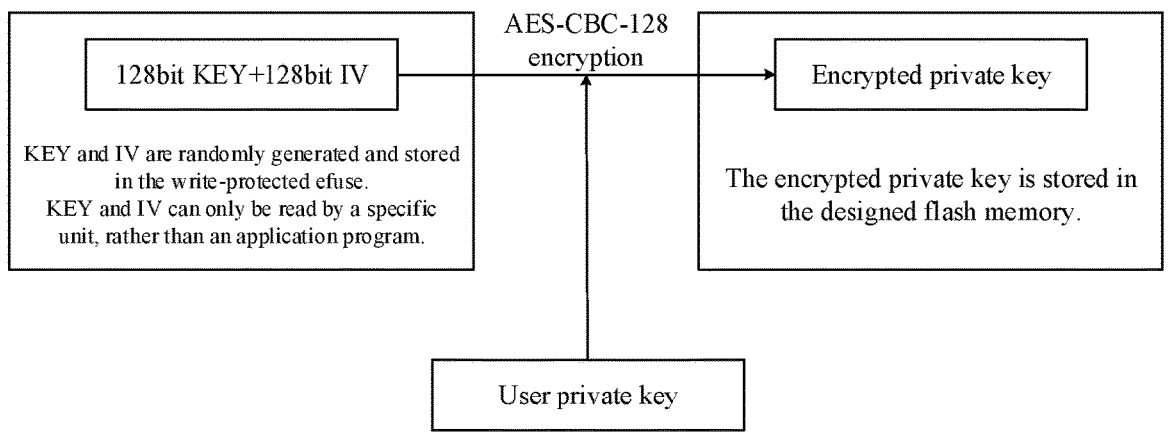
FIG. 2 is a schematic diagram of an acquisition process of an encrypted private key according to an illustrative embodiment.

In the embodiments of the present disclosure, the encrypted flash-memory partition data may include an encrypted private key of the IoT apparatus, and the encrypted private key may be acquired by a relevant encrypted key (KEY) and an initialization vector (IV) in combination with a user private key through an encryption algorithm. As an example, FIG. 2 is a schematic diagram of an acquisition process of an encrypted private key according to an illustrative embodiment. As shown in FIG. 2, an Advanced Encryption Standard (AES)-Cipher-block chaining (CBC)-128-bit encryption key may be generated based on the randomly generated 128-bit KEY and 128-bit IV in combination with the user private key, and the encryption key may be stored in the flash memory (Flash). The randomly generated 128-bit KEY and 128-bit IV may be stored in the efuse, and a corresponding hardware unit may be designed. Only through this hardware unit can the KEY and IV stored in the efuse be acquired, so as to improve data security.

Figure 3:
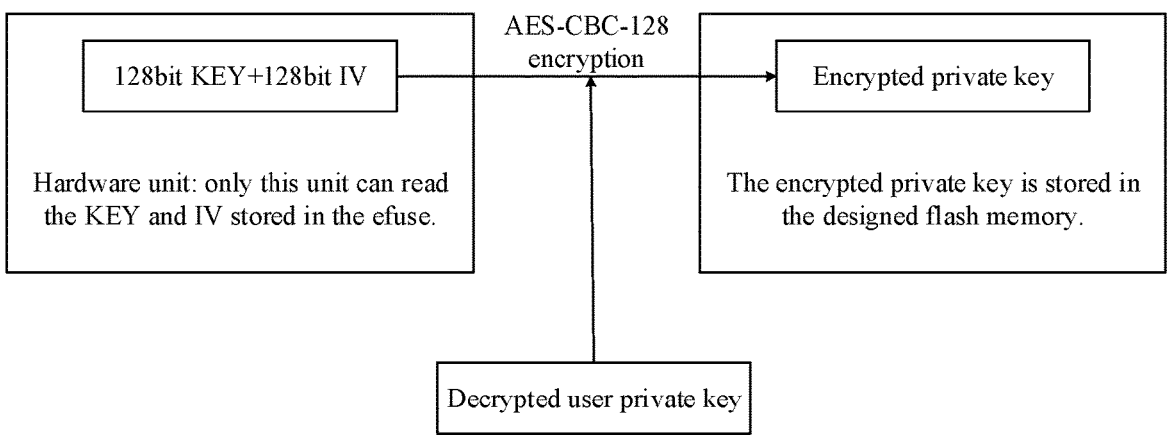
FIG. 3 is a schematic diagram of an acquisition process of a user private key according to an illustrative embodiment.

As an example, FIG. 3 is a schematic diagram of an acquisition process of a user private key according to an illustrative embodiment. As shown in FIG. 3, in the embodiments of the present disclosure, the KEY and IV stored in the efuse may be acquired through a pre-designed hardware unit to perform decryption based on the KEY, the IV and the encrypted private key stored in the Flash, so as to acquire the decrypted user private key. Thus, the acquisition of the root key can be restricted from the hardware level, and the security of the IoT apparatus can be further improved.

In the embodiments of the present disclosure, the authentication signature of the bootloader firmware and the authentication signature of the App firmware are verified, and the App firmware and the encrypted flash-memory partition data in the Flash are decrypted based on the encryption key in the one-time programmable memory if the verification is passed, so as to securely boot up the IoT apparatus, thus ensuring the controllability of the firmware source, ensuring the data security and improving the security level of the IoT apparatus.

Figure 4:
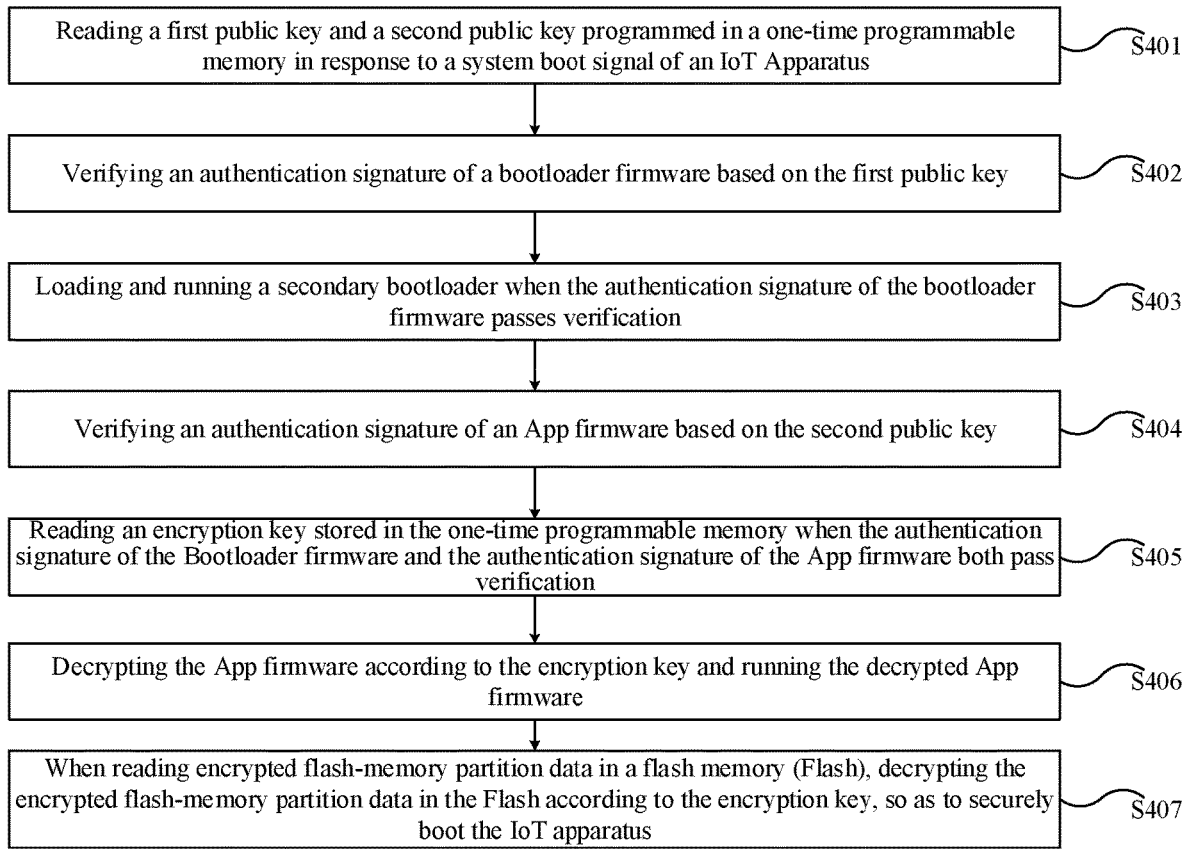
FIG. 4 is a flow chart of another secure boot method of an IoT apparatus according to an illustrative embodiment.

In an embodiment, the public key in the one-time programmable memory may be read, so that the authentication signature of the bootloader firmware and the authentication signature of the App firmware can be verified based on the public key. As an example, FIG. 4 is a flow chart of another secure boot method of an IoT apparatus according to an illustrative embodiment. As shown in FIG. 4, the method may include but not be limited to the following steps.

At step S401, a first public key and a second public key programmed in a one-time programmable memory are read, in response to a system boot signal of the IoT apparatus.

In the embodiments of the present disclosure, the first public key is used to verify the validity of the authentication signature of the bootloader firmware, and the second public key is used to verify the validity of the authentication signature of the App firmware.

For example, in response to receiving the system boot signal of the IoT apparatus, the first public key and the second public key pre-programmed in the one-time programmable memory are read.

At step S402, an authentication signature of a bootloader firmware is verified based on the first public key.

For example, it is verified whether the authentication signature of the bootloader firmware is correct based on the first public key.

At step S403, when the authentication signature of the bootloader firmware passes verification, a secondary bootloader is loaded and run.

For example, when the authentication signature of the bootloader firmware is verified to be correct, it is determined that the authentication signature of the bootloader firmware passes the verification, and the preset secondary bootloader is loaded and run.

At step S404, an authentication signature of an application layer (App) firmware is verified based on the second public key.

For example, it is verified whether the authentication signature of the App firmware is correct based on the second public key.

At step S405, an encryption key stored in the one-time programmable memory is read, when the authentication signature of the bootloader firmware and the authentication signature of the App firmware both pass the verification.

In the embodiments of the present disclosure, step S405 may be realized by adopting any one manner of the embodiments of the present disclosure, which is not limited by the embodiments of the present disclosure and also will not be repeated.

At step S406, the App firmware is decrypted according to the encryption key, and the decrypted App firmware is run.

In the embodiments of the present disclosure, step S406 may be realized by adopting any one manner of the embodiments of the present disclosure, which is not limited by the embodiments of the present disclosure and also will not be repeated.

At step S407, when encrypted flash-memory partition data in a flash memory (Flash) is read, the encrypted flash-memory partition data is decrypt according to the encryption key, so as to securely boot up the IoT apparatus.

In the embodiments of the present disclosure, step S407 may be realized by adopting any one manner of the embodiments of the present disclosure, which is not limited by the embodiments of the present disclosure and will not be repeated.

In the embodiments of the present disclosure, the public keys in the one-time programmable memory may be read, so as to verify the authentication signature of the bootloader firmware and the authentication signature of the App firmware based on the public keys, and the App firmware and the encrypted flash-memory partition data in the Flash are decrypted based on the encryption key in the one-time programmable memory when the verification is passed, so as to securely boot up the IoT apparatus, thus ensuring the controllability of the firmware source, ensuring the data security and improving the security level of the IoT apparatus.

In some embodiments of the present disclosure, before the encryption key stored in the one-time programmable memory is read, the method may further include the following steps: a flag bit stored in the one-time programmable memory is read by the secondary bootloader; according to the flag bit, it is determined whether the App firmware turns on a flash-memory encryption and/or whether the App firmware is encrypted; when the App firmware turns on the flash-memory encryption and the App firmware is encrypted, the step of reading the encryption key stored in the one-time programmable memory is executed.

In the embodiments of the present disclosure, the flag bit is used to represent whether the App firmware turns on the flash-memory encryption and whether the App firmware is encrypted, and the flag bit is provided with a write protection attribute.

For example, by the preset secondary bootloader, the flag bit pre-stored in the one-time programmable memory and used to represent whether the App firmware turns on the flash-memory encryption and whether the App firmware is encrypted is read; according to the flag bit, it is determined whether the App firmware turns on the flash-memory encryption and whether the App firmware is encrypted; when it is determined that the App firmware turns on the flash-memory encryption and the App firmware is encrypted, the step of reading the encryption key stored in the one-time programmable memory in the foregoing embodiments is executed.

In some embodiments, the method further includes the following steps: a flash-memory partition to be encrypted in the Flash is determined according to the App firmware when the App firmware turns on the flash-memory encryption and the App firmware is not encrypted; the encryption key is randomly generated, and the App firmware and the data in the flash-memory partition to be encrypted are encrypted and stored respectively based on the encryption key; the encryption key is stored in the one-time programmable memory, and the encryption key is provided with a write protection attribute; the flag bit in the one-time programmable memory is updated, and the IoT apparatus is reboot.

For example, if it is determined that the App firmware turns on the flash-memory encryption and the App firmware is not encrypted, the flash-memory partition to be encrypted in the Flash is determined according to the App firmware (for example, a partition table); the bootloader of the IoT apparatus randomly generates the encryption key, and based on this encryption key, the App firmware and the data in the flash-memory partition to be encrypted are encrypted and stored respectively; this encryption key is stored in the one-time programmable memory, and the file attribute of the encryption key is set as the write protection attribute; and the flag bit in the one-time programmable memory is updated to represent that the App firmware turns on the flash-memory encryption and the App firmware has been encrypted, and the IoT apparatus is reboot.

In the embodiments of the present disclosure, the flash-memory partition to be encrypted in the Flash can be determined according to the App firmware when the App firmware is not encrypted, thereby avoiding the encryption key leakage caused by physically reading the flash data, and ensuring that the encryption key of each IoT apparatus is different, so that even if the encryption key of one IoT apparatus is stolen, the security of other IoT apparatuses of the same model will not be affected.

Figure 5:
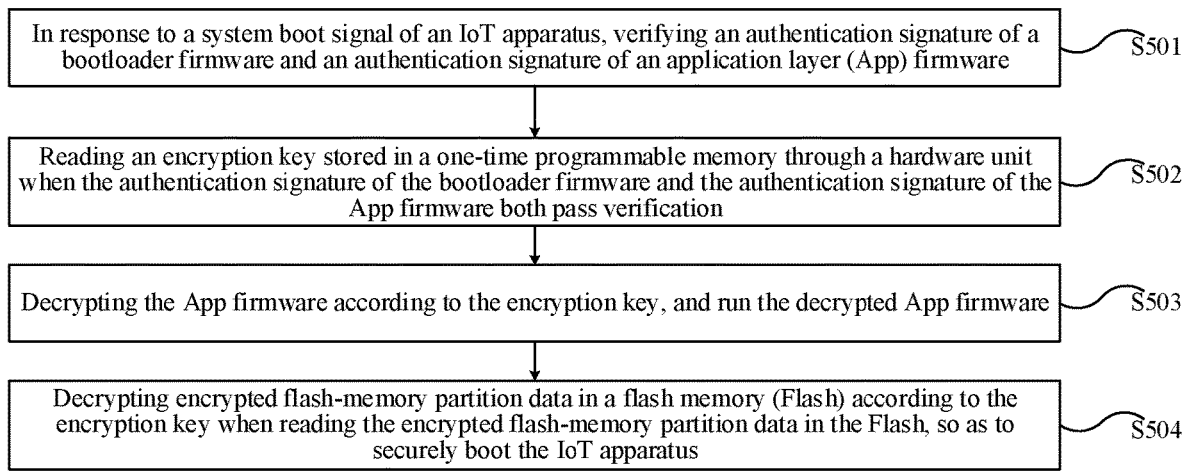
FIG. 5 is a flow chart of yet another secure boot method of an IoT apparatus according to an illustrative embodiment.

In an embodiment, the encryption key may be read by a hardware device for subsequent processes. As an example, FIG. 5 is a flow chart of another secure boot method of an IoT apparatus according to an illustrative embodiment. As shown in FIG. 5, the method may include but not be limited to the following steps.

At step S501, an authentication signature of a bootloader firmware and an authentication signature of an application layer (App) firmware are verified, in response to a system boot signal of an IoT apparatus.

In the embodiments of the present disclosure, step S501 may be realized by adopting any one manner of the embodiments of the present disclosure, which is not limited by the embodiments of the present disclosure and also will not be repeated.

At step S502, when the authentication signature of the bootloader firmware and the authentication signature of the App firmware both pass verification, an encryption key stored in a one-time programmable memory is read by a hardware unit.

For example, when the authentication signature of the bootloader firmware and the authentication signature of the App firmware both pass the verification, the encryption key stored in the one-time programmable memory is read by the pre-designed hardware unit.

In the embodiments of the present disclosure, the above hardware unit is the only hardware unit designed in advance that can read the information stored in the one-time programmable memory.

At step S503, the App firmware is decrypted according to the encryption key, and the decrypted App firmware is run.

In the embodiments of the present disclosure, step S503 may be realized by adopting any one manner of the embodiments of the present disclosure, which is not limited by the embodiments of the present disclosure and also will not be repeated.

At step S504, when encrypted flash-memory partition data in a flash memory (Flash) is read, the encrypted flash-memory partition data is decrypted according to the encryption key, so as to securely boot up the IoT apparatus.

In the embodiments of the present disclosure, step S504 may be realized by adopting any one manner of the embodiments of the present disclosure, which is not limited by the embodiments of the present disclosure and also will not be repeated.

In the embodiments of the present disclosure, the public keys in the one-time programmable memory may be read, so as to verify the authentication signature of the bootloader firmware and the authentication signature of the App firmware based on the public keys, and the App firmware and the encrypted flash-memory partition data in the Flash are decrypted based on the encryption key in the one-time programmable memory, when the verification is passed, so as to securely boot up the IoT apparatus. Therefore, the acquisition of the key can be restricted from the hardware level, the data security can be ensured, and the security level of the IoT apparatus can be improved.

In some embodiments of the present disclosure, the above method may further include the following steps: when an over-the-air technology (OTA) firmware upgrade process is entered, an OTA firmware to be upgraded is acquired; the IoT apparatus is reboot and an authentication signature of the OTA firmware to be upgraded is verified to enter a reboot installation stage; after the reboot is completed, it is determined that the OTA firmware to be upgraded is successfully upgraded.

In the embodiments of the present disclosure, the above OTA firmware to be upgraded includes the authentication signature of the OTA firmware to be upgraded.

For example, when the IoT apparatus enters the OTA firmware upgrade process, the OTA firmware to be upgraded including the authentication signature is acquired; then, the IoT apparatus is reboot and it is verified whether the authentication signature of the OTA firmware to be upgraded is correct, and the reboot installation stage is performed to install the OTA firmware to be upgraded when the authentication signature of the OTA firmware to be upgraded is determined to be correct; after the reboot is completed, it is determined that the OTA firmware to be upgraded is successfully upgraded.

In some embodiments, the above method may further include encrypting the OTA firmware to be upgraded according to the encryption key in the process of entering the reboot installation stage of the OTA firmware to be upgraded.

For example, in the process of entering the reboot installation stage of the OTA firmware to be upgraded, the OTA firmware to be upgraded is encrypted according to the encryption key in any of the above embodiments.

In the embodiments of the present disclosure, the OTA firmware to be upgraded may go through the signature authentication to verify the source of the firmware, thus enhancing the firmware authentication capability of the IoT apparatus, so as to prevent the installation of a malicious firmware without authentication and to further enhance the security of the IoT apparatus.

Figure 6:
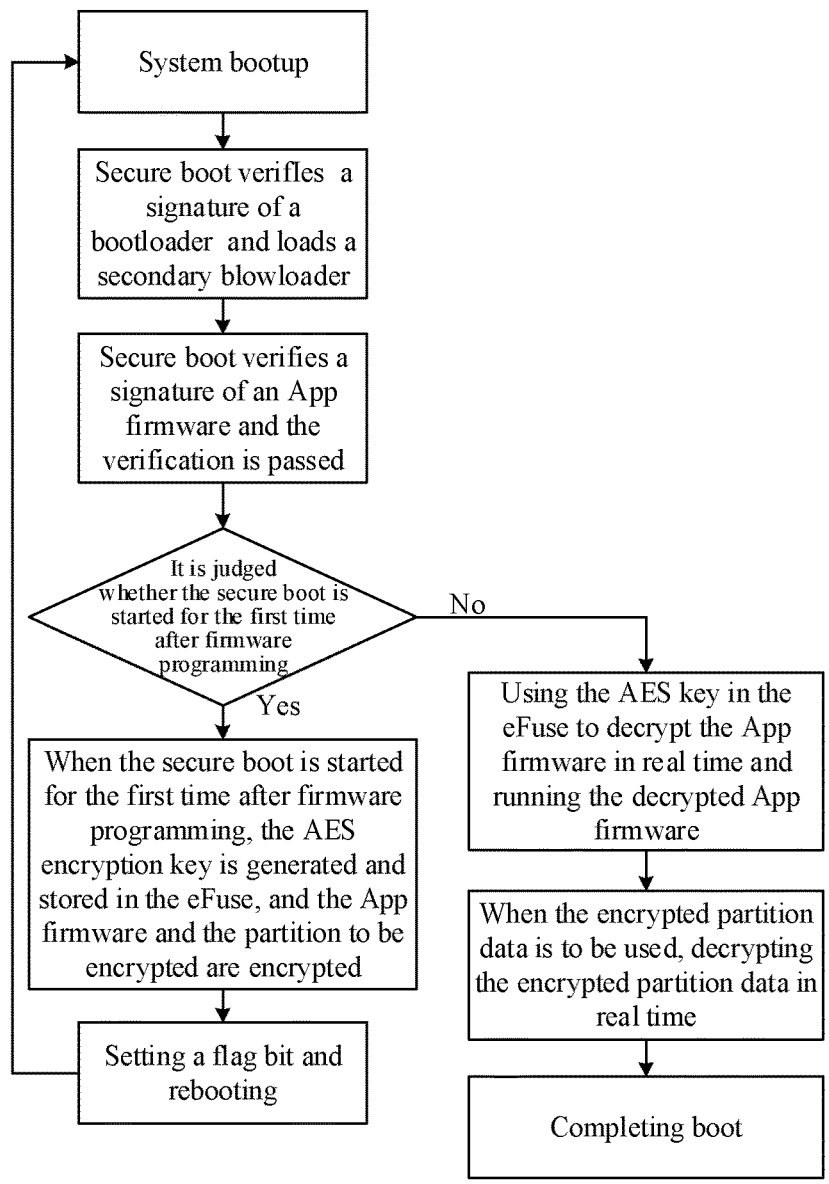
FIG. 6 is a schematic diagram of a secure boot process of an IoT apparatus according to an illustrative embodiment.

FIG. 6 is a schematic diagram of a secure boot process of an IoT apparatus according to an illustrative embodiment. As shown in FIG. 6, in the secure boot process of the IoT apparatus in the embodiments of the present disclosure, after an apparatus bootup instruction is received, a secure boot verification is performed to verify whether a signature of a bootloader is correct, and a secondary bootloader is loaded after the signature of the bootloader is verified to be correct; then, it is verified whether an App signature is correct based on the secondary bootloader; after the App signature is verified to be correct, it is judged whether the secure boot is started for the first time after firmware programming.

In response to determining that the secure boot is started for the first time after firmware programming, an AES encryption key is randomly generated, the encryption key is stored in a one-time programmable memory, the App firmware and the flash-memory partition to be encrypted are encrypted based on the encryption key, and the encrypted App firmware is stored in the encrypted flash-memory partition; then, a flag bit is set to represent whether the App firmware turns on a flash-memory encryption and whether the App firmware has been encrypted, and the IoT apparatus is reboot.

Or, in response to determining that the secure boot is not started for the first time after firmware programming, an AES encryption key in the effuse is used to decrypt the App firmware, the decrypted App firmware is run, and when data in an encrypted partition is to be used, the data in the encrypted partition is decrypted by using the encryption key, so as to securely boot up the IoT apparatus.

Figure 7:
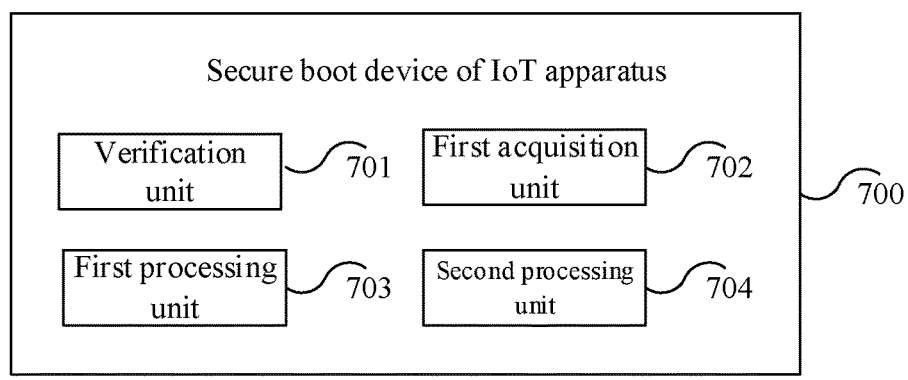
FIG. 7 is a schematic diagram of a secure boot device of an IoT apparatus according to an illustrative embodiment.

FIG. 7 is a schematic diagram of a secure boot device of an IoT apparatus according to an illustrative embodiment. As shown in FIG. 7, the device 700 includes a verification unit 701, a first acquisition unit 702, a first processing unit 703 and a second processing unit 704. The IoT apparatus supports at least one protocol. The verification unit 701 is used to verify an authentication signature of a bootloader firmware and an authentication signature of an application layer (App) firmware in response to a system boot signal of the IoT apparatus. The first acquisition unit 702 is used to read an encryption key stored in a one-time programmable memory when the authentication signature of the bootloader firmware and the authentication signature of the App firmware both pass verification. The encryption key is provided with a write protection attribute. The first processing unit 703 is used to decrypt the App firmware according to the encryption key and run the decrypted App firmware. The second processing unit 704 is used to decrypt encrypted flash-memory partition data in a flash memory (Flash) according to the encryption key when reading the encrypted flash-memory partition data in the Flash, so as to securely boot up the IoT apparatus.

In an embodiment, the verification unit 701 is specifically used to: read a first public key and a second public key programmed in a one-time programmable memory, in which the first public key is used to verify the validity of the authentication signature of the bootloader firmware, and the second public key is used to verify the validity of the authentication signature of the App firmware; verify the authentication signature of the bootloader firmware based on the first public key; load and run a secondary bootloader when the authentication signature of the bootloader firmware passes verification; and verify the authentication signature of the App firmware based on the second public key.

In an alternative embodiment, the verification unit 701 is also used to: read a flag bit stored in a one-time programmable memory through a secondary bootloader, in which the flag bit represents whether the App firmware turns on a flash-memory encryption and whether the App firmware is encrypted, and the flag bit is provided with a write protection attribute; according to the flag bit, determine whether the App firmware turns on the flash-memory encryption and/or whether the App firmware is encrypted; execute the step of reading the encryption key stored in the one-time programmable memory when the App firmware turns on the flash-memory encryption and the App firmware is encrypted.

In some embodiments, the verification unit 701 is further used to: determine a flash-memory partition to be encrypted in the Flash according to the App firmware when the App firmware turns on the flash-memory encryption and the App firmware is not encrypted; randomly generate the encryption key, and respectively encrypt and store the App firmware and the data in the flash-memory partition to be encrypted based on the encryption key; store the encryption key in the one-time programmable memory, and provide the encryption key with a write protection attribute; update the flag bit in the one-time programmable memory and reboot the IoT apparatus.

In an embodiment, the first acquisition unit 702 is specifically used to read the encryption key stored in the one-time programmable memory through a hardware unit.

Figure 8:
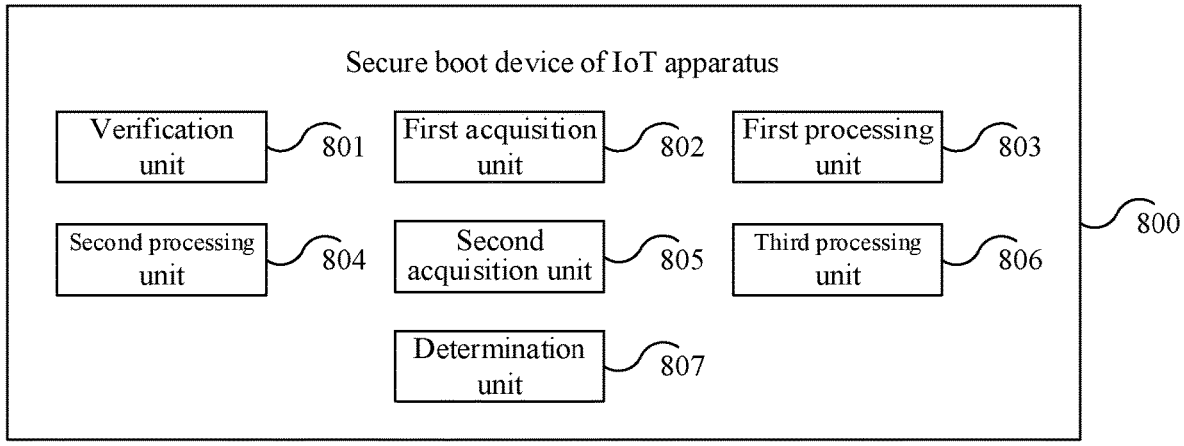
FIG. 8 is a schematic diagram of another secure boot device of an IoT apparatus according to an illustrative embodiment.

In an embodiment, the above device further includes a second acquisition unit, a third processing unit and a determination unit. As an example, FIG. 8 is a schematic diagram of another secure boot device of an IoT apparatus according to an illustrative embodiment. As shown in FIG. 8, the device 800 further includes a second acquisition unit 805, a third processing unit 806 and a determination unit 807. The second acquisition unit 805 is used to acquire an OTA firmware to be upgraded when entering a firmware upgrading OTA process. The OTA firmware to be upgraded includes an authentication signature of the OTA firmware to be upgraded. The third processing unit 806 is used to reboot the IoT apparatus and verify the authentication signature of the OTA firmware to be upgraded to enter a reboot installation stage. The determination unit 807 is used to determine that the OTA firmware to be upgraded is successfully upgraded after the reboot is completed. The units 801 to 804 in FIG. 8 have the same structures and functions as the units 701 to 704 in FIG. 7.

Figure 9:
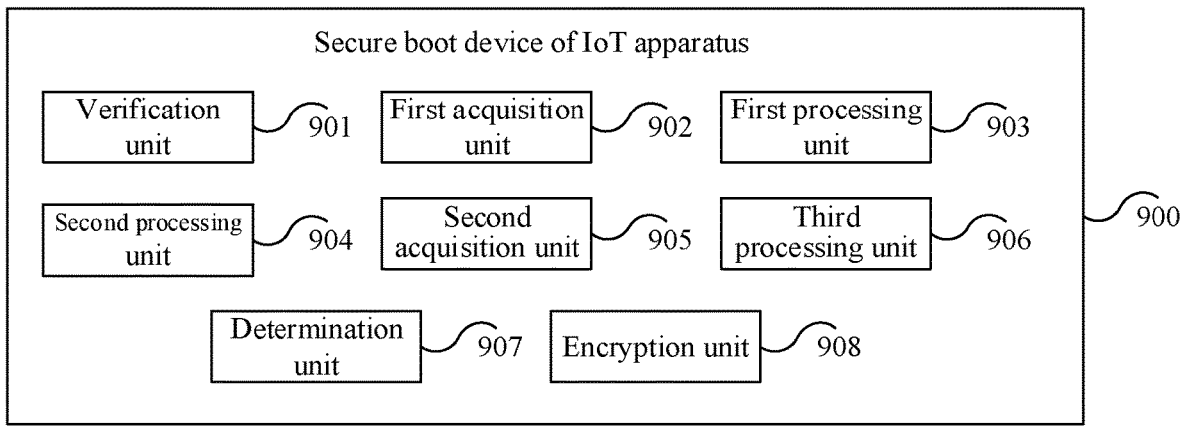
FIG. 9 is a schematic diagram of yet another secure boot device of an IoT apparatus according to an illustrative embodiment.

In an alternative embodiment, the above device further includes an encryption unit. As an example, FIG. 9 is a schematic diagram of another secure boot device of an IoT apparatus according to an illustrative embodiment. As shown in FIG. 9, the device further includes an encryption unit 908, which is used to encrypt the OTA firmware to be upgraded according to the encryption key in the process of entering the reboot installation stage of the OTA firmware to be upgraded. The units 901 to 907 in FIG. 9 have the same structures and functions as the units 801 to 807 in FIG. 8.

According to the devices of the embodiments of the present disclosure, the authentication signature of the bootloader firmware and the authentication signature of the App firmware can be verified, and the App firmware and the encrypted flash-memory partition data in the Flash can be decrypted based on the encryption key in the one-time programmable memory if the verification is passed, so as to securely boot up the IoT apparatus, which ensures the controllability of the firmware source, and ensures the data security, thus improving the security level of the IoT apparatus.

With regard to the devices in the above embodiments, the specific manner in which each unit performs operations has been described in detail in the embodiments of the methods, and will not be described in detail here.

Figure 10:
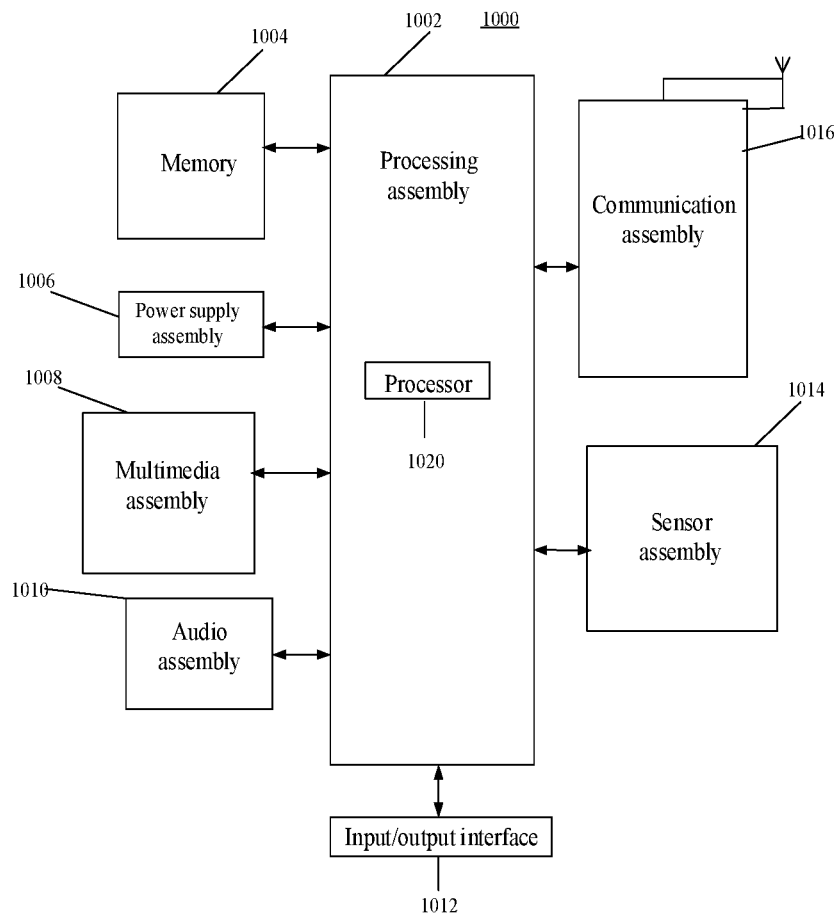
FIG. 10 is a block diagram of a device according to an illustrative embodiment.

FIG. 10 is a block diagram of a device according to an illustrative embodiment. The device may be an IoT apparatus.

As shown in FIG. 10, the device 1000 may include one or more of the following assemblies: a processing assembly 1002, a memory 1004, a power supply assembly 1006, a multimedia assembly 1008, an audio assembly 1010, an input/output (I/O) interface 1012, a sensor assembly 1014, and a communication assembly 1016.

The processing assembly 1002 generally controls the overall operation of the device 1000, such as operations associated with display, telephone call, data communication, camera operation and recording operation. The processing assembly 1002 may include one or more processors 1020 to execute instructions to complete all or part of the steps of the method described above. In addition, the processing assembly 1002 can include one or more units to facilitate the interaction between the processing assembly 1002 and other assemblies. For example, the processing assembly 1002 can include a multimedia unit to facilitate interaction between the multimedia assembly 1008 and the processing assembly 1002.

The memory 1004 is configured to store various types of data to support operations on the device 1000. Examples of these data include instructions for any application or method operating on the device 1000, such as contact data, phone book data, messages, pictures, videos, and the like. The memory 1004 can be realized by any type of volatile or nonvolatile memory apparatus or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply assembly 1006 provides power to various assemblies of the device 1000. The power supply assembly 1006 can include a power management system, one or more power sources, and other assemblies associated with generating, managing and distributing power for the device 1000.

The multimedia assembly 1008 includes a screen that provides an output interface between the device 1000 and a user. In some embodiments, the screen may include a liquid crystal display (LCD) and a touch panel (TP). If the screen includes a touch panel, the screen may be implemented as a touch screen to receive an input signal from the user. The touch panel includes one or more touch sensors to sense touch, sliding and gestures on the touch panel. The said touch sensor may not only sense the boundary of a touch or sliding action, but also detect the duration and pressure related to the touch or sliding operation. In some embodiments, the multimedia assembly 1008 includes a front camera and/or a rear camera. When the device 1000 is in an operation mode, such as a shooting mode or a video mode, the front camera and/or the rear camera can receive external multimedia data. Each of the front camera and the rear camera can be a fixed optical lens system or have a focal length and an optical zoom capability.

The audio assembly 1010 is configured to output and/or input audio signals. For example, the audio assembly 1010 includes a microphone (MIC), which is configured to receive external audio signals when the device 1000 is in operation modes, such as a call mode, a recording mode and a voice recognition mode. The received audio signal may be further stored in the memory 1004 or transmitted via the communication assembly 1016. In some embodiments, the audio assembly 1010 further includes a speaker for outputting audio signals.

The input/output interface 1012 provides an interface between the processing assembly 1002 and peripheral interface units, which can be keyboards, click wheels, buttons, etc. These buttons may include, but are not limited to, a home button, a volume button, a start button and a lock button.

The sensor assembly 1014 includes one or more sensors for providing various aspects of state evaluation for the device 1000. For example, the sensor assembly 1014 can detect the on/off state of the device 1000, the relative positioning of assemblies, for example, the assemblies are a display and a keypad of the device 1000, and the sensor assembly 1014 can detect the position change of the device 1000 or an assembly of the device 1000, the presence or absence of contact between the user and the device 1000, the orientation or acceleration/deceleration of the device 1000 and the temperature change of the device 1000. The sensor assembly 1014 may include a proximity sensor which is configured to detect the presence of a nearby object without any physical contact. The sensor assembly 1014 may also include an optical sensor, such as a CMOS or CCD image sensor, for use in imaging applications. In some embodiments, the sensor assembly 1014 may further include an acceleration sensor, a gyro sensor, a magnetic sensor, a pressure sensor or a temperature sensor.

The communication assembly 1016 is configured to facilitate wired or wireless communication between the device 1000 and other apparatuses. The device 1000 can access a wireless network based on communication standards, such as WiFi, 2G or 3G, or a combination thereof. In an illustrative embodiment, the communication assembly 1016 receives a broadcast signal or broadcast related information from an external broadcast management system via a broadcast channel. In an illustrative embodiment, the communication assembly 1016 further includes a near field communication (NFC) unit to facilitate short-range communication. For example, the NFC unit can be implemented based on radio frequency identification (RFID) technology, infrared data association (IrDA) technology, ultra-wideband (UWB) technology, Bluetooth (BT) technology and other technologies.

In an illustrative embodiment, the device 1000 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic elements for performing the above methods.

In an illustrative embodiment, there is also provided a non-transitory computer-readable storage medium including instructions, such as the memory 1004 including instructions, which can be executed by the processor 1020 of the device 1000 to complete the above method. For example, the non-transitory computer-readable storage medium can be a ROM, a random access memory (RAM), a CD-ROM, a magnetic tape, a floppy disk, an optical data storage device, etc.

Other embodiments of the present disclosure will easily occur to those skilled in the art after considering the specification and practicing the present disclosure disclosed herein. The present disclosure is intended to cover any variation, use or adaptation of the present disclosure, which follows the general principles of the present disclosure and includes common sense or common technical means in the related art not disclosed in the present disclosure. The specification and embodiments are to be regarded as illustrative only, with the true scope and spirit of the present disclosure being indicated by the following claims.

It should be understood that the present disclosure is not limited to the precise structure described above and shown in the drawings, and various modifications and changes can be made without departing from its scope. The scope of the present disclosure is limited only by the appended claims.

What is claimed is:

1. A secure boot method of an Internet of Things (IoT) apparatus, wherein the IoT apparatus supports at least one protocol, the method comprising:
   in response to a system boot signal of the IoT apparatus, verifying an authentication signature of a bootloader firmware and an authentication signature of an application layer (App) firmware;
   reading an encryption key stored in a one-time programmable memory, in response to determining that the authentication signature of the bootloader firmware and the authentication signature of the App firmware both pass verification, wherein the encryption key is configured to have a write protection attribute;
   decrypting the App firmware according to the encryption key, and running the decrypted App firmware; and
   in response to determining to read encrypted flash-memory partition data in a flash memory (Flash), decrypting the encrypted flash-memory partition data according to the encryption key, so as to securely boot up the IoT apparatus.

2. The method according to claim 1, wherein verifying the authentication signature of the bootloader firmware and the authentication signature of the App firmware comprises:
   reading a first public key and a second public key programmed in the one-time programmable memory, wherein the first public key is configured to verify the validity of the authentication signature of the bootloader firmware, and the second public key is configured to verify the validity of the authentication signature of the App firmware;
   verifying the authentication signature of the bootloader firmware based on the first public key;
   loading and running a secondary bootloader in response to determining that the authentication signature of the bootloader firmware passes verification; and
   verifying the authentication signature of the App firmware based on the second public key.

3. The method according to claim 2, further comprising:
   reading a flag bit stored in the one-time programmable memory through the secondary bootloader, wherein the flag bit represents whether the App firmware turns on a flash-memory encryption and whether the App firmware is encrypted, and wherein the flag bit is configured to have a write protection attribute;
   according to the flag bit, determining at least one of whether the App firmware turns on the flash-memory encryption and whether the App firmware is encrypted; and
   executing the step of reading the encryption key stored in the one-time programmable memory in response to determining that the App firmware turns on the flash-memory encryption and the App firmware is encrypted.

4. The method according to claim 3, further comprising:
determining a flash-memory partition to be encrypted in the Flash according to the App firmware in response to determining that the App firmware turns on the flash-memory encryption and the App firmware is not encrypted;
randomly generating the encryption key, and encrypting and storing the App firmware and data in the flash-memory partition to be encrypted based on the encryption key respectively;
storing the encryption key in the one-time programmable memory, and configuring the encryption key to have a write protection attribute; and
updating the flag bit in the one-time programmable memory, and rebooting the IoT apparatus.

5. The method according to claim 1, wherein reading the encryption key stored in the one-time programmable memory comprises:
reading the encryption key stored in the one-time programmable memory through a hardware unit.

6. The method according to claim 1, further comprising:
in response to determining to enter a firmware upgrading over-the-air technology (OTA) process, acquiring an OTA firmware to be upgraded, wherein the OTA firmware to be upgraded comprises an authentication signature of the OTA firmware to be upgraded;
rebooting the IoT apparatus and verifying the authentication signature of the OTA firmware to be upgraded, to enter a reboot installation stage; and
determining that the OTA firmware to be upgraded is successfully upgraded after the reboot is completed.

7. The method according to claim 6, further comprising:
encrypting the OTA firmware to be upgraded according to the encryption key in the process of entering the reboot installation stage of the OTA firmware to be upgraded.

8. An Internet of Things (IoT) apparatus, wherein the IoT apparatus supports at least one protocol, the apparatus comprising:
at least one processor; and
a memory communicated with the at least one processor, wherein the memory stores instructions executable by the at least one processor, and when the instructions are executed by the at least one processor, the at least one processor is configured to:
verify an authentication signature of a bootloader firmware and an authentication signature of an application layer (App) firmware, in response to a system boot signal of the IoT apparatus;
read an encryption key stored in a one-time programmable memory, in response to determining that the authentication signature of the bootloader firmware and the authentication signature of the App firmware both pass verification, wherein the encryption key is configured to have a write protection attribute;
decrypt the App firmware according to the encryption key, and run the decrypted App firmware; and
in response to determining to read encrypted flash-memory partition data in a flash memory (Flash), decrypt the encrypted flash-memory partition data according to the encryption key, so as to securely boot up the IoT apparatus.

9. The IoT apparatus according to claim 8, wherein the processor is further configured to:
read a first public key and a second public key programmed in the one-time programmable memory, wherein the first public key is configured for verifying the validity of the authentication signature of the bootloader firmware, and the second public key is configured for verifying the validity of the authentication signature of the App firmware;
verify the authentication signature of the bootloader firmware based on the first public key;
load and run a secondary bootloader in response to determining that the authentication signature of the bootloader firmware passes verification; and
verify the authentication signature of the App firmware based on the second public key.

10. The IoT apparatus according to claim 9, wherein the processor is further configured to:
read a flag bit stored in the one-time programmable memory through the secondary bootloader, wherein the flag bit represents whether the App firmware turns on a flash-memory encryption and whether the App firmware is encrypted, and wherein the flag bit is configured to have a write protection attribute;
according to the flag bit, determine at least one of whether the App firmware turns on the flash-memory encryption and whether the App firmware is encrypted; and
execute the step of reading the encryption key stored in the one-time programmable memory in response to determining that the App firmware turns on the flash-memory encryption and the App firmware is encrypted.

11. The IoT apparatus according to claim 10, wherein the processor is further configured to:
determine a flash-memory partition to be encrypted in the Flash according to the App firmware in response to determining that the App firmware turns on the flash-memory encryption and the App firmware is not encrypted;
randomly generate the encryption key, and encrypt and store the App firmware and data in the flash-memory partition to be encrypted based on the encryption key respectively;
store the encryption key in the one-time programmable memory, and configure the encryption key to have a write protection attribute; and
update the flag bit in the one-time programmable memory, and reboot the IoT apparatus.

12. The IoT apparatus according to claim 8, wherein the processor is further configured to:
read the encryption key stored in the one-time programmable memory through a hardware unit.

13. The IoT apparatus according to claim 8, wherein the processor is further configured to:
acquire an over-the-air technology (OTA) firmware to be upgraded in response to determining to enter a firmware upgrading OTA process, wherein the OTA firmware to be upgraded comprises an authentication signature of the OTA firmware to be upgraded;
reboot the IoT apparatus and verify the authentication signature of the OTA firmware to be upgraded to enter a reboot installation stage; and
determine that the OTA firmware to be upgraded is successfully upgraded after the reboot is completed.

14. The IoT apparatus according to claim 13, wherein the processor is further configured to:
encrypt the OTA firmware to be upgraded according to the encryption key in the process of entering the reboot installation stage of the OTA firmware to be upgraded.

15. A non-transitory computer-readable storage medium storing computer instructions, wherein the computer instructions are configured to allow a computer to:

verify an authentication signature of a bootloader firmware and an authentication signature of an application layer (App) firmware, in response to a system boot signal of the IoT apparatus;

read an encryption key stored in a one-time programmable memory, in response to determining that the authentication signature of the bootloader firmware and the authentication signature of the App firmware both pass verification, wherein the encryption key is configured to have a write protection attribute;

decrypt the App firmware according to the encryption key, and running the decrypted App firmware; and in response to determining to read encrypted flash-memory partition data in a flash memory (Flash), decrypt the encrypted flash-memory partition data according to the encryption key, so as to securely boot up the IoT apparatus.

* * * * *